J. CLARK.
DIVIDED RING FOR PIPE CLAMPS AND THE LIKE.
APPLICATION FILED SEPT. 27, 1921.
1,423,754.
Patented July 25, 1922.
3 SHEETS—SHEET 1.
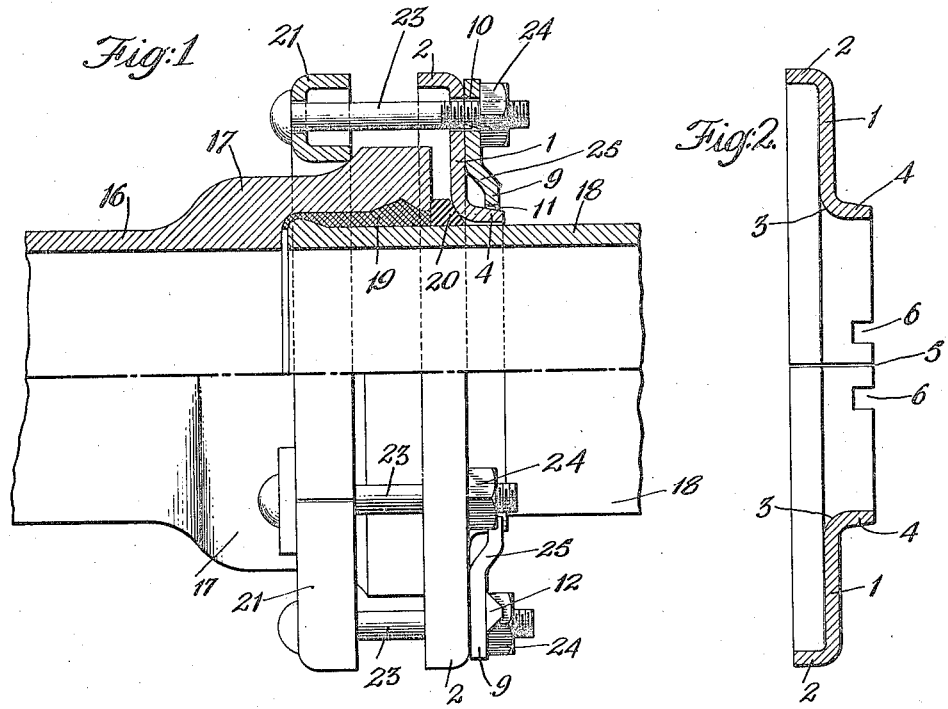
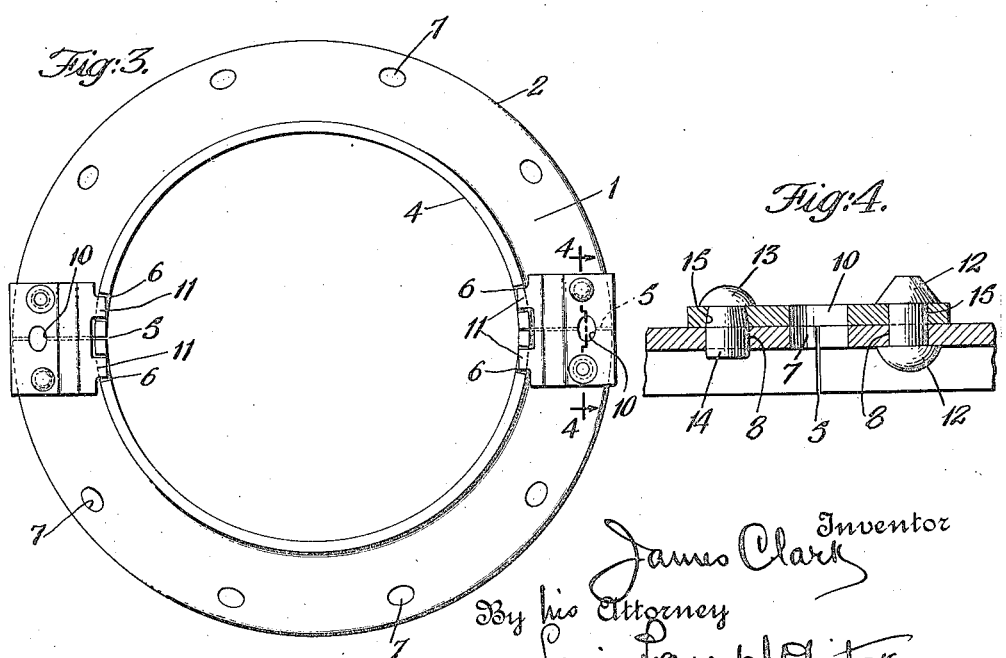

J. CLARK.
DIVIDED RING FOR PIPE CLAMPS AND THE LIKE.
APPLICATION FILED SEPT. 27, 1921.
1,423,754.
Patented July 25, 1922.
3 SHEETS—SHEET 2.
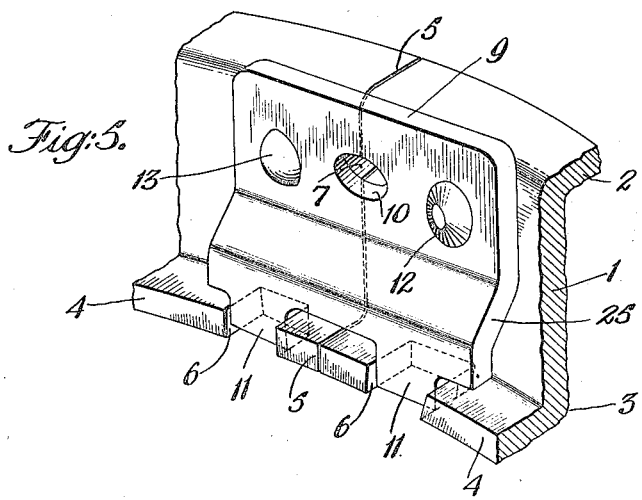
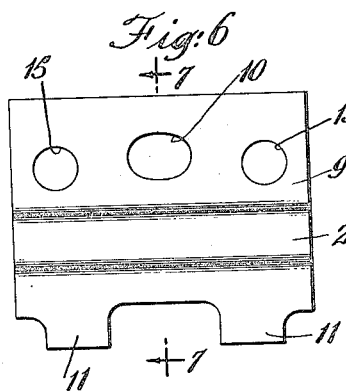
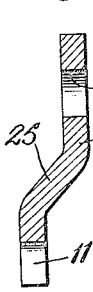
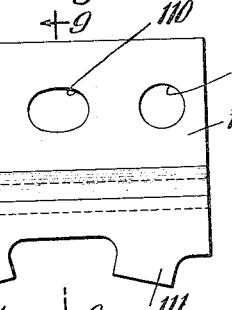
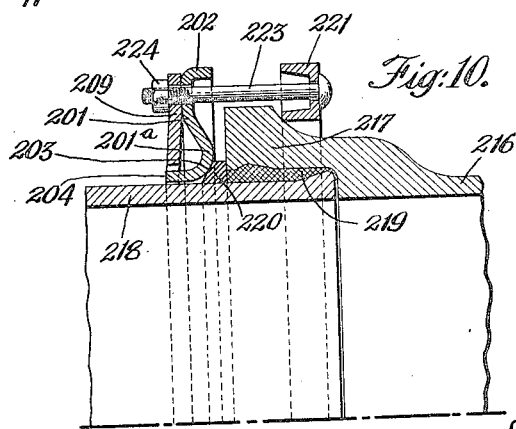
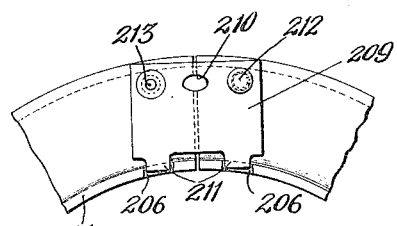

J. CLARK.
DIVIDED RING FOR PIPE CLAMPS AND THE LIKE.
APPLICATION FILED SEPT. 27, 1921.
1,423,754.
Patented July 25, 1922.
3 SHEETS—SHEET 3.
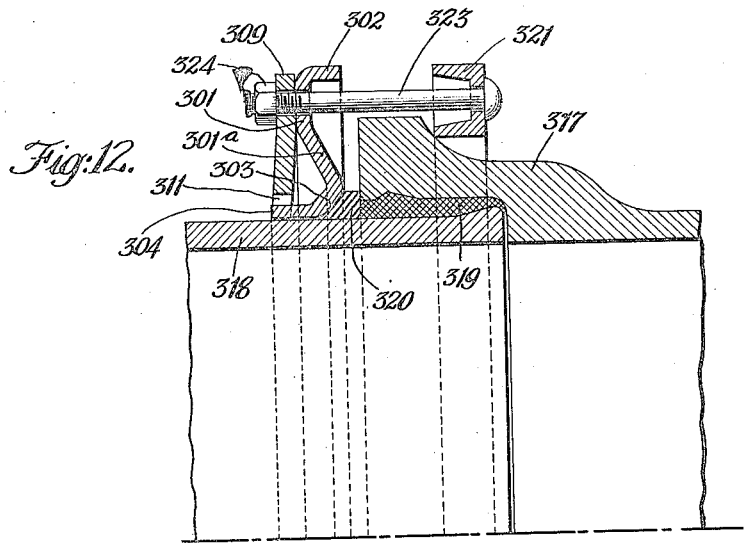
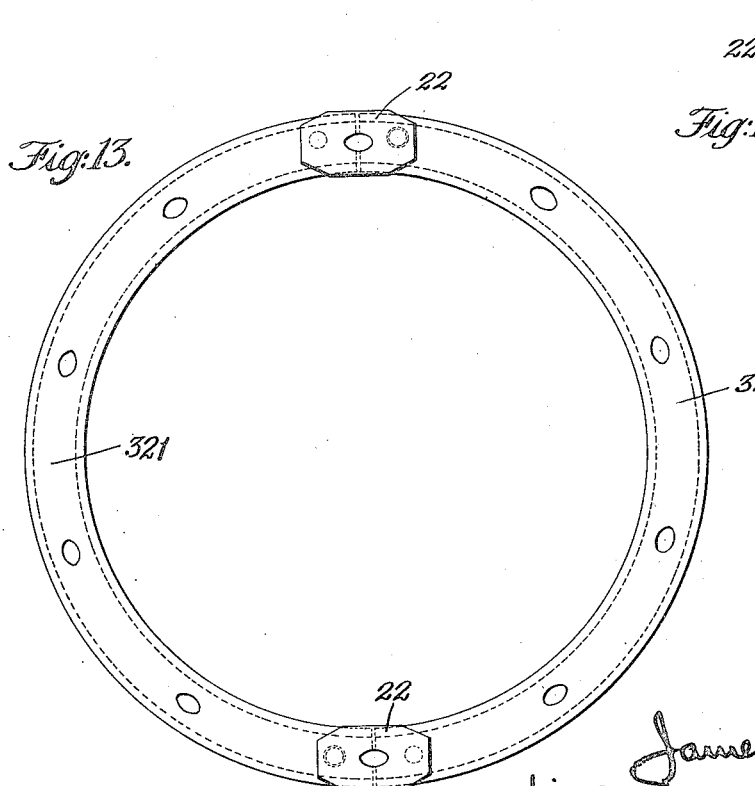
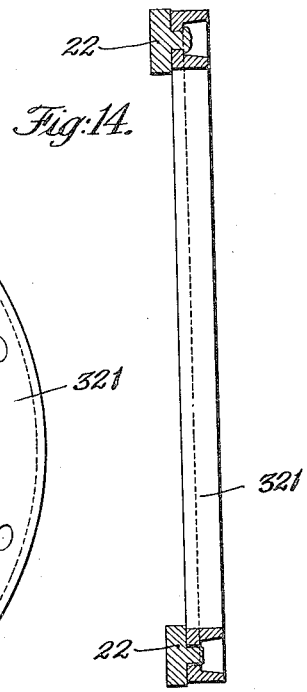
Inventor
James Clark
By his Attorney
Louis Prevost Whitaker

UNITED STATES PATENT OFFICE.

JAMES CLARK, OF BRADFORD, PENNSYLVANIA, ASSIGNOR TO S. R. DRESSER MANUFACTURING COMPANY, OF BRADFORD, PENNSYLVANIA, A CORPORATION OF PENNSYLVANIA.

DIVIDED RING FOR PIPE CLAMPS AND THE LIKE.

1,423,754.        Specification of Letters Patent.     Patented July 25, 1922.

Application filed September 27, 1921. Serial No. 503,666.

*To all whom it may concern:*

Be it known that I, JAMES CLARK, a citizen of the United States, residing at Bradford, in the county of McKean and State of Pennsylvania, have invented certain new and useful Improvements in Divided Rings for Pipe Clamps and the like; and I do hereby declare the following to be a full, clear, and exact description of the invention, such as will enable others skilled in the art to which it appertains to make and use the same.

My invention consists in the novel features hereinafter described, reference being had to the accompanying drawings which illustrate several embodiments of my invention, selected by me for purposes of illustration, and the said invention is fully disclosed in the following description and claims.

The invention relates to divided rings for pipe clamps and the like. These rings are ordinarily used for repairing leaks at the joints of pipe lines where they must be placed position around the pipe section without disturbing the continuity of the line and hence it is necessary that the rings be formed in sections in order to enable them to be placed in position for use. It is to be understood, however, that these rings, made in accordance with my invention, may be employed for any purpose for which they may be convenient or desirable.

In carrying out my invention I form the body of the ring with an annular plate member adapted to stand perpendicularly to the axis of the pipe line, the plate member being provided on one side or face with a packing engaging portion for compressing packing or a packing ring, and the plate member is provided on the opposite face with an annular flange member extending parallel to the axis of the pipe line. The plate member is also provided with a series of bolt holes usually arranged as an annular series. The ring body is divided into sections. Ordinarily I prefer to form the ring in two sections, but it may be formed in any desired number of sections. The lines of division between adjacent sections are so arranged as to pass through bolt holes in the plate member of the ring, and the said sections have plain meeting ends accurately fitted so as to make the adjacent surfaces of the adjacent sections continuous.

As these rings are subjected to great strain from the belts with which they are used, it is necessary to provide means for uniting the section of the ring in such a manner as to prevent distortion of the ring when subjected to bolt strain. Heretofore this has usually been accomplished by employing bridge pieces extending over the lines of division between the sections, and provided with bolt holes so that the bolt strain can be applied to the bridge pieces and distributed to the adjacent portions of contiguous sections of the ring body, for example, as illustrated in my former Patent No. 1,062,438, dated May 20, 1913. According to my present invention, I provide the flange portion of the ring body with locking apertures or recesses on opposite sides of the line of separation between adjacent sections, and I provide a bridge plate to engage the plate member of the ring body, the bridge plate having a bolt aperture designed to register with the divided bolt aperture formed between adjacent sections of the ring and being further provided with means for uniting it to the plate member of the ring on opposite sides of the line of separation between adjacent sections, the said bridge plate being further provided on its inner edge with locking fingers adapted to enter the locking recesses or apertures in the flange portion of the ring on opposite sides of the line of separation between the sections so that the bridge piece not only locks the parts of the plate member together in the plane of the plate member, but also locks the adjacent portions of the flange member together at points somewhat distant from the plane of the plate member, and on the opposite side or face of the ring from that which engages the packing to be compressed thereby. This construction produces an extremely strong and rigid ring and the interlocking of the fingers on the bridge plate with the locking recesses in the flange portion of the ring effectually prevents any distortion of the ring when subjected to the pressure of the clamping bolts, and particularly resists any tendency to distort the ring by the tension of the bolts, which do not pass through the bridge plate, but which apply pressure at points distant therefrom. In practice I prefer to form these rings of wrought metal, steel or wrought iron being preferred, but I do not limit myself to this material.

In the accompanying drawings,

Fig. 1 represents an elevation, partly in section, of a bell and spigot joint showing one of my improved clamping rings applied thereto in connection with a bull ring for compressing a packing ring.

Fig. 2 is a sectional view of the body portion of my improved clamping ring showing the line of division between adjacent sections, and the locking recesses in the flange portion of the ring.

Fig. 3 is a plan view of the ring showing the bridge plates in locking position.

Fig. 4 is a sectional view on the line 4—4 of Fig. 3.

Fig. 5 is a detail perspective view of a portion of the ring body on opposite sides of a line of division between adjacent sections, and showing the bridge plate in locking engagement therewith.

Fig. 6 is a detail view of one form of bridge plate.

Fig. 7 is a section on the line 7—7 of Fig. 6.

Fig. 8 is a view of a slightly modified form of bridge plate.

Fig. 9 is a section on the line 9—9 of Fig. 8.

Fig 10 is a sectional view of a bell and spigot joint, showing a modified form of my improved divided ring applied thereto in connection with a bull ring for compressing a packing ring.

Fig. 11 is an elevation of a portion of the ring shown in Fig. 10 and illustrating the bridge plate for connecting the adjacent sections.

Fig. 12 is a view similar to Fig. 10 showing another modified form of my improved divided ring applied to a bell and spigot joint in connection with a bull ring.

Fig. 13 is a plan view of the bull ring which I prefer to employ in connection with my improved divided ring.

Fig. 14 is a sectional view thereof.

Referring to Figs. 1 to 7 inclusive, 1 represents the annular plate member of my improved divided ring which is preferably provided on the outer edge with a reinforcing flange 2, and at its inner edge with a packing engaging portion, indicated at 3, which is preferably curved or beveled for the purpose of compressing the packing in a direction toward the pipe. The plate member of the ring is also provided at its inner edge with an annular flange member, indicated at 4, which extends parallel to the axis of the pipe aperture and projects from the face of the plate member opposite the packing engaging portion 3. The ring is formed in sections, and in this instance is shown in two sections, the lines of division between adjacent sections being indicated at 5. The flange 4 is provided on opposite sides of the line of separation with locking apertures or recesses 6—6 which are in a different plane from the plane of the plate member 1, as will be readily understood by reference to Fig. 2. The plate member is also provided with a plurality of bolt holes, indicated at 7, and these apertures are so arranged that each of the lines of separation 5 between adjacent sections will pass through one of the bolt holes 7. The plate member is also provided at opposite sides of the line of division 5 between adjacent sections, with locking apertures 8, see Fig. 4. 9 represents one of the bridge plates, illustrated in detail in Fig. 7. Each bridge plate is provided with a bolt aperture 10 adapted to register with the divided bolt aperture 7, as clearly shown in Fig. 5, for example, and the inner edge portions of the bridge plate are provided with locking fingers 11—11 which, when the bridge plate is in operative position, engage the locking apertures or recesses 6 in the flange member 4 of the ring on opposite sides of the lines of division between adjacent sections, as clearly illustrated in Fig. 5, and also in Fig. 7.

Means are also provided for locking the bridge plate to the plate member on opposite sides of the lines of separation between adjacent sections. This may be accomplished in several different ways, by providing the plate member and the bridge plate, the one with projections engaging apertures in the other, the said projections being formed by studs, bolts or rivets in any preferred manner. In order to insure the greatest convenience in the transportation and assembling of the part of the ring, I prefer to permanently attach one of the bridge plates to each section of the ring and provide for detachably connecting each bridge plate to the other section with which it is not permanently connected. Thus, as illustrated in the drawings, each of the bridge plates 9 is provided on opposite sides of the bolt holes with apertures 15 and with an attaching rivet 12, passing through one of said apertures and permanently uniting the bridge plate to one section of the ring and extending through one of the locking apertures in the plate member, the bridge plate being further provided on the opposite side of the line of division between adjacent sections with a stud 13 passing through the other aperture 15, for detachably engaging the other locking aperture in the plate member of the ring. This stud can be formed in any desired way, but is conveniently formed by passing a rivet through an aperture in the bridge plate and riveting it or otherwise securing it in position with respect to the bridge plate, leaving a portion, indicated at 14, in Fig. 4, for detachably engaging one of the locking apertures in the plate member, as clearly illustrated in that figure. Obviously the bridge plate could be provided with two similar projections such as 14 and need not be permanently attached to either section of the ring, and the projections 14 can be made integral with the bridge plate or can be provided on the plate member for engaging the apertures 15 of the bridge plate.

In Fig. 1 I have shown a bell and spigot joint for pipe lines with my improved divided ring applied thereto in the manner usual in repairing a leaky joint. In this figure 16 represents one pipe section provided with the bell end 17 and 18 represents the spigot end of an adjacent pipe section, extending into the bell 17 and provided with the usual packing 19 of lead, cement or other suitable material. Assuming that this joint has become leaky, a packing ring, illustrated at 20, and formed preferably of rubber or other suitable compressible material, is placed around the spigot 18 in position to engage the spigot, the end of the bell at the packing recess thereof, and the end of the permanent packing 19. One of my improved divided rings is placed around the spigot without disturbing the joint and assembled in the manner illustrated in Figs. 1, 3 and 5, and a divided bull ring, illustrated at 21, is placed around the bell end 17. The bull ring, as illustrated in Figs. 13 and 14, is formed in sections and provided with bridge plates 22 in the manner similar to that illustrated in my former patent before referred to, for convenience of assembling. Bolts, indicated at 23, are passed through the bull ring and divided clamping ring and extend through the bridge plates of both rings, it being desirable that the bridge plate of one ring shall not come directly opposite the bridge plate of another ring, although this is not particularly important, and the nuts 24 are applied to the bolts, in the usual manner. As the nuts are drawn up, the packing 20 is compressed against the mouth of the bell 17, the packing 19, and the exterior surface of the spigot 18, thus effectually sealing the joint and stopping any leak therein. It will be seen that as one of the bolts passes centrally through the bolt hole 10 of the bridge plate 9, its pressure will be distributed to the adjacent sections of the plate member and the interlocking connections 12 and 13 between the bridge plate and the adjacent ends of the sections of the plate member prevent them from spreading or separating. It will also be seen that the interlocking relation between the fingers 11 of the bridge plate and the rearwardly projecting flange 4 of the divided ring locks the sections of the ring together at points directly in line with the packing engaging portion 3, but at points at a distance from the plane of the plate member and on the opposite side or face of the ring, thereby greatly stiffening and strengthening the sectional ring and making it, to all intents and purposes, as strong and rigid as a solid ring. Where the plate member of the ring extends in a plane substantially perpendicular to the axis of the pipe aperture, as in Figs. 1 to 5, the bridge plate is preferably offset, as illustrated at 25, so that the locking fingers 11 are in a different plane from the main portion of the bridge plate containing the bolt aperture 10 and apertures 15, as is clearly shown in Figs. 1, 5, 6 and 7.

In Figs. 8 and 9 I have shown a slight modification of the bridge plate, in which 109 represents the plate provided with the bolt hole 110, locking apertures 115 in line with the plate member, and offset portion 125, substantially as hereinbefore described. In this instance, however, the locking fingers, illustrated at 111, are disposed angularly to each other and project from the lower edge of the bridge plate slightly toward each other.

In Figs. 10 and 11 I have illustrated a slight modification in the form of my improved ring, in which the plate member 201 is offset, as illustrated at 201ª so as to bring the packing engaging portion 203 in a different plane from the portion of the plate member which is engaged by the bridge plate 209, the flange member 204 being provided with the locking recesses 206, as before described. In this instance it is unnecessary to provide the bridge plate with a material offset portion, and it may be made straight or substantially straight, as illustrated in Figs. 10 and 11, it being understood that the bridge plate is provided with the fingers 211 and a bolt hole 210, and is secured to the plate member by the studs or rivets 212, 213, in the manner previously described. This form is advantageous in some instances as it provides great strength with a minimum amount of material, and also provides more clearance between the bell end 217 and plate member 201. A divided bull ring 221 is illustrated in Fig. 10 in connection with the usual bolts 223 and nuts 224.

In Fig. 12 I have illustrated a further modification of my improved divided clamping ring, in which the plate member 301 is offset, as indicated at 301ª, and provided with an inclined or angular packing engaging portion 303 from which the flange 304 projects, the plate member being provided with the usual reinforcing flange 302. In this form also the bridge plate, indicated at 309, is made substantially straight without the angular offset shown in Figs. 7 and 9, and is provided with the locking fingers 311, engaging the locking recesses in the flange 304, in the manner previously described, the other features being exactly the same as shown and described in connection with the previously mentioned figures. In Fig. 12 the bell and spigot joint with which the ring is ordinarily employed is indicated, 317 representing the bell and 318 the spigot, united by the usual packing 319, the compressible packing ring being illustrated at 320, and the ring being shown in connection with the usual divided bull ring 321, bolts 323 and nuts 324.

Obviously modifications of my invention may be made in adapting the divided ring to special uses and situations without departing from the spirit of the invention, the essential feature of which is the provision for an interlocking engagement between the inner edge of the bridge plate and a flange member of the ring, on opposite sides of a line of division between the sections of the ring and on the opposite face of the ring from that which engages and compresses the packing with which it is used. It will be understood as to all forms of the ring herein described that I prefer to form the sections of the ring of wrought metal, steel or iron being preferred, and that the meeting ends of the sections on opposite sides of the lines of separation are accurately fitted so as to make the adjacent surfaces of adjacent sections continuous. The meeting ends therefore come neatly and accurately together and react on each other to assist in holding the ring in practically integral condition when connected. This is my preferred construction, but I wish it to be understood that the sections of the ring may be formed of other material if desired and the strength imparted to the ring by the interlocking of the locking fingers on the bridge plate and the locking recess in the flange portion of the ring is such that any inaccuracies in the fit of any of the adjacent end portions of the sections will not interfere with the efficiency of the ring to any material extent. I prefer to form the sections by stamping or pressing the wrought metal into the proper form, as the sections of the ring can thus be formed with the greatest accuracy and with a minimum of expense as to labor and material.

What I claim and desire to secure by Letters Patent is:—

1. A divided ring for pipe clamps and the like, comprising an annular plate member provided with bolt holes, said ring being formed in sections, the lines of separation between the ends of adjacent sections passing through bolt holes, said ring sections being provided adjacent to their inner edges with locking apertures and a bridge plate connecting said sections, each provided with means for connecting it with the plate member on opposite sides of the line of separation between adjacent sections and having its inner edge provided with locking fingers for engaging the locking apertures of the ring sections on opposite sides of said lines of separation.

2. A divided ring for pipe clamps and the like, comprising an annular plate member provided with bolt holes, an annular packing engaging portion, and an annular flange portion projecting from one face of the plate member adjacent to the pipe aperture therein, said ring being formed in sections, the lines of separation between the ends of adjacent sections passing through bolt holes, the flange portion of the ring being provided with locking apertures on opposite sides of the lines of separation of said sections, bridge plates for connecting said sections, each having a bolt hole to register with one of the divided bolt holes of the plate member and having its inner edge provided with locking fingers for engaging the locking apertures in the flange portion of the ring on opposite sides of a line of separation, and means for connecting each bridge plate to the plate member on opposite sides of a line of separation of the ring section.

3. A divided ring for pipe clamps and the like, comprising an annular plate member provided with bolt holes, an annular packing engaging portion on one face of the ring and an annular flange portion projecting from the inner edge of the ring and extending from the face opposite the packing engaging portion, said ring being formed in sections, the lines of separation between the ends of adjacent sections passing through bolt holes, the flange portion of said ring being provided with locking apertures on opposite sides of the lines of separation of said sections, bridge plates for connecting said sections each provided with a bolt hole to register with one of the divided bolt holes of the plate member and having locking fingers at its inner edge for engaging said locking apertures in the flange portion of the ring on opposite sides of a line of separation between sections, and means for connecting the bridge plates to the plate member on opposite sides of said line of separation of the ring sections.

4. A divided ring for pipe clamps and the like, comprising an annular plate member provided with bolt holes, and an annular flange portion projecting from one face of the plate member adjacent to its inner edge, said ring being formed in sections separated on lines passing through certain of said bolt holes, and said flange member being provided with locking apertures on opposite sides of said lines of separation, said locking apertures being located in a different plane from the portion of the plate member in which the bolt holes are formed, bridge plates adapted to engage the plate member and extend over said lines of separation between the sections thereof, said bridge plates being provided at their inner edges with projections for engaging the locking apertures in the flange portion of the ring on opposite sides of said lines of separation of the sections and each having a bolt aperture to register with a divided bolt aperture of the ring, and means for connecting said bridge plates with the plate member on opposite sides of said divided bolt holes.

5. A divided ring for pipe clamps and the like, comprising an annular plate member provided with bolt holes, said plate member having a packing engaging portion adjacent to its inner edge in a different plane from the portion of the plate member containing the bolt holes and being provided adjacent to its inner edge with an annular flange member extending on the opposite side of the plate member from the packing engaging portion, said ring being formed in sections separated on lines passing through certain of said bolt holes, and said annular flange member being provided with locking apertures on opposite sides of said lines of separation, bridge plates for uniting said sections each provided with a bolt hole adapted to register with one of the divided bolt holes of the plate member and having its inner edge provided with locking fingers for engaging the locking apertures in the flange member on opposite sides of a line of separation between adjacent sections, and means for uniting the locking plate to the plate member on opposite sides of the divided bolt holes.

In testimony whereof I affix my signature.

JAMES CLARK.